(No Model.)
R. H. TRESTED.
Water Closet Pan.
No. 243,329.          Patented June 21, 1881.
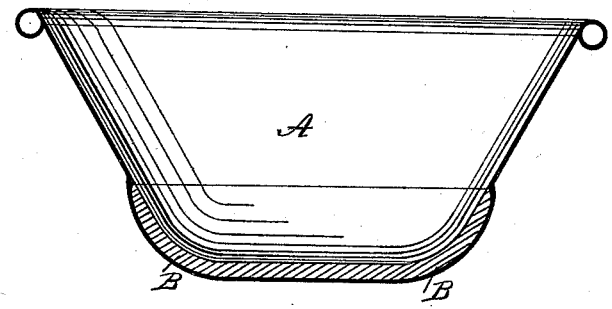
WITNESSES:
W. L. Bennom
John W. Ripley
INVENTOR
Richard H. Trested by
S. S. Gordon
ATTORNEY.

UNITED STATES PATENT OFFICE.

RICHARD H. TRESTED, OF NEW YORK, N. Y.

WATER-CLOSET PAN.

SPECIFICATION forming part of Letters Patent No. 243,329, dated June 21, 1881.

Application filed April 11, 1881. (No model.)

*To all whom it may concern:*

Be it known that I, RICHARD H. TRESTED, a citizen of the United States, residing at New York, in the county of New York and State of New York, have invented a new and useful Improvement in Collodion or Celluloid Coated Water-Closet Pans, which is fully set forth in the following specification and accompanying drawing, in which the figure illustrates a sectional view of my improved water-closet pan coated with a lining of celluloid or collodion.

I will here premise that the ordinary sheet-metal water-closet pan is subject to excessive corrosion, which destroys the pan and necessitates frequent expense and inconvenience for repairs or replacement. It has been sought to remedy this by lining metal pans with enamel, caused to adhere to the surface of the metal by the ordinary method of enameling; but this enamel lining is found to crack and scale to such an extent as to more than neutralize any theoretic advantages in its use. Earthenware pans, as proposed in certain English patents, are, from their frangible character, unfit for the rough usage, jarring, &c., to which the operation of the pan in the working of the water-closet apparatus subjects them. In another instance a sheet-metal water-closet pan has been provided with an inside bottom-lining of porcelain, which is secured in position by means of an annular bead or shoulder spun against or upon the edge of the porcelain lining. This, however, is open to all of the objections appertaining to the enamel lining before referred to, and, moreover, the cost of the pan is increased by the extra time required to spin the bead after inserting the lining, and, also, urine will, during use, find its way between the bead and the lining, so as in time to corrode and destroy the metal.

My invention is designed to provide an efficient remedy for all of these defects; and to this end I provide a sheet-metal water-closet pan with a lining of celluloid or collodion, as hereinafter described and claimed. The celluloid or collodion lining will be found practically incapable of corrosion, and without seam or flaw. It insures the permanence of the pan against all chemical action from the substances with which it comes in contact in its present use, and the sheet metal, being external to the pan and out of contact with the corrosive liquids, gives mechanical strength and durability to the entire structure. Said lining of celluloid or collodion also contains considerable camphor, which will serve as a disinfectant, and hence be extremely serviceable.

In the drawing A indicates the pan, of the usual shape, and B the lining, of collodion or celluloid, on the inside of the bottom of the same.

The collodion or celluloid may be applied in a liquid state, and then finished when dry, which method I prefer; or it may be pressed onto the metal in a plastic state by means of dies, so that it will adhere to and constitute a part of the pan, be without joints, and be held to the pan without any fastening device whatever.

In some cases I may form a small bead or rib around the pan during the manufacture of the latter. This rib, however, has no effect upon the lining, but may serve as a guide-line, showing the height to which the lining should be applied.

Any shade can readily be obtained by coloring the compound, either before or after its application.

The pan thus formed is ready for the market, being applied to use by soldering, or otherwise attaching it to the rock-shaft by which water-closet pans are ordinarily supported.

In the drawing the collodion covering is represented as covering only the inside bottom of the pan, which is less expensive than to cover the entire inside of the pan, and for all practical purposes the lining shown will answer, as the water and all deposits therein rest in that portion of the vessel.

What I claim is—

A water-closet pan composed of sheet metal, with a celluloid or collodion lining, which has been pressed upon or applied, while in a liquid state, to the bottom portion or the whole of the inside of the pan, thereby forming a smooth coating without joints, and held thereon without fastening devices, substantially as and for the purpose set forth.

RICHARD H. TRESTED.

Witnesses:
S. J. GORDON,
JOHN W. RIPLEY.